US010414207B2

United States Patent
Lai

(10) Patent No.: US 10,414,207 B2
(45) Date of Patent: Sep. 17, 2019

(54) CASTER BRAKE DEVICE

(71) Applicant: DER SHENG CO., LTD, Taoyuan (TW)

(72) Inventor: Yun-Chun Lai, Taoyuan (TW)

(73) Assignee: DER SHENG CO., LTD, Taoyuan (TW)

( * ) Notice: Subject to any disclaimer, the term of this patent is extended or adjusted under 35 U.S.C. 154(b) by 5 days.

(21) Appl. No.: 15/837,306

(22) Filed: Dec. 11, 2017

(65) Prior Publication Data
US 2019/0143748 A1    May 16, 2019

(30) Foreign Application Priority Data
Nov. 10, 2017   (TW) .............................. 106216793 U

(51) Int. Cl.
| | | |
|---|---|---|
| *B60B 33/00* | (2006.01) | |
| *B60B 33/02* | (2006.01) | |
| *F16D 49/00* | (2006.01) | |
| *F16D 63/00* | (2006.01) | |

(Continued)

(52) U.S. Cl.
CPC ...... *B60B 33/0078* (2013.01); *B60B 33/0092* (2013.01); *B60B 33/02* (2013.01); *F16D 49/00* (2013.01); *F16D 63/006* (2013.01); *B60B 33/0042* (2013.01); *B60B 33/0049* (2013.01); *B60B 33/0068* (2013.01);

(Continued)

(58) Field of Classification Search
CPC ..... Y10T 16/195; Y10T 16/184; Y10T 16/18; Y10T 403/32336; Y10T 403/32361; Y10T 70/5841; B60B 33/021; B60B 33/025; B60B 33/0042; B60B 33/0078; B60B 2200/242; B60B 2200/43; B62B 5/04; B62B 5/0461; B62B 2301/0467; B62B 5/048; B62B 9/087; F16D 49/00; F16D 2125/60; F16D 2121/16; F16D 63/006
See application file for complete search history.

(56) References Cited

U.S. PATENT DOCUMENTS

| | | | | |
|---|---|---|---|---|
| 4,333,207 A | * | 6/1982 | Atwood .............. | B60B 33/0042 16/35 R |
| 5,232,071 A | * | 8/1993 | Kawanabe .......... | B60B 33/0039 16/35 R |

(Continued)

*Primary Examiner* — Bradley T King
*Assistant Examiner* — Mahbubur Rashid
(74) *Attorney, Agent, or Firm* — WPAT, PC

(57) ABSTRACT

A caster brake device includes a brake gear, receiving unit, driving unit, elastic element and operating unit connected to the driving unit. The brake gear is disposed at an axle or wheel of a mobile carrier. Stop slots are disposed at the brake gear circumferentially. The receiving unit has a penetrating recess corresponding in position to the stop slots. The driving unit is disposed in the receiving unit and includes a penetrating portion corresponding in position to the penetrating recess and a stop spindle penetrating the penetrating recess and the penetrating portion. Two ends of the stop spindle correspond in position to the stop slots and thus are movably confined to the penetrating recess to enter or exit the stop slots. The elastic element has two ends abutting against the receiving unit and driving unit, respectively, to enable the stop spindle to undergo reciprocating motion within the penetrating recess.

7 Claims, 5 Drawing Sheets

(51) Int. Cl.
 *F16D 121/16* (2012.01)
 *F16D 125/60* (2012.01)
(52) U.S. Cl.
 CPC ...... *B60B 33/0084* (2013.01); *F16D 2121/16* (2013.01); *F16D 2125/60* (2013.01)

(56) References Cited

U.S. PATENT DOCUMENTS

| | | | | |
|---|---|---|---|---|
| 5,368,133 A * | 11/1994 | Yang | ................... | B60B 33/0042 16/35 R |
| 5,617,934 A * | 4/1997 | Yang | ................... | B60B 33/0042 16/35 R |
| 5,632,360 A * | 5/1997 | Melara | ............... | B60B 33/0042 16/35 R |
| 6,298,949 B1 * | 10/2001 | Yang | ..................... | B62B 5/0414 188/19 |
| 6,360,851 B1 * | 3/2002 | Yang | ................... | B60B 33/0028 16/35 R |
| 6,378,663 B1 * | 4/2002 | Lee | ........................... | A61H 3/04 188/19 |
| 6,619,438 B1 * | 9/2003 | Yang | ................... | B60B 33/0021 188/1.12 |
| 7,367,432 B2 * | 5/2008 | Chen | ....................... | B62B 7/08 188/19 |
| 7,708,119 B2 * | 5/2010 | Chen | ...................... | B62B 9/082 188/19 |
| 7,866,453 B2 * | 1/2011 | Wu | ........................ | A45C 5/145 16/35 R |
| 7,950,108 B2 * | 5/2011 | Yang | ................... | B60B 33/0021 16/35 R |
| 8,376,374 B2 * | 2/2013 | Zhong | ..................... | B60B 1/006 188/20 |
| 8,418,315 B1 * | 4/2013 | Lin | ..................... | B60B 33/0084 16/35 D |
| 8,499,413 B1 * | 8/2013 | Tsai | ........................ | B60B 33/02 16/35 R |
| 8,522,397 B1 * | 9/2013 | Tsai | .................... | B60B 33/0042 16/35 R |
| 8,540,059 B2 * | 9/2013 | Li | ........................... | B62B 9/087 188/1.12 |
| 8,714,314 B1 * | 5/2014 | Chen | ...................... | A45C 5/145 16/35 R |
| 8,783,420 B2 * | 7/2014 | Lai | ......................... | A45C 5/145 188/1.12 |
| 2004/0178025 A1 * | 9/2004 | Zweideck | ............... | B62B 9/082 188/2 F |
| 2006/0175783 A1 * | 8/2006 | Lan | ........................ | B60T 1/005 280/47.38 |
| 2007/0215414 A1 * | 9/2007 | Chiang | ............... | B60B 33/0021 188/1.12 |
| 2008/0217115 A1 * | 9/2008 | Chen | ........................ | B62B 7/08 188/1.12 |
| 2011/0083298 A1 * | 4/2011 | Yan | ..................... | B60B 33/0021 16/31 R |
| 2011/0247903 A1 * | 10/2011 | Boukhny | ............ | B60B 33/0042 188/68 |
| 2012/0111672 A1 * | 5/2012 | Park | .................... | B60B 33/0018 188/69 |
| 2012/0160617 A1 * | 6/2012 | Qi | ....................... | B60B 33/0078 188/1.12 |
| 2014/0238784 A1 * | 8/2014 | Yeo | ....................... | B60B 33/025 188/1.12 |
| 2015/0096846 A1 * | 4/2015 | Lin | ....................... | B60B 33/0042 188/1.12 |
| 2015/0239291 A1 * | 8/2015 | Jie | ...................... | B60B 33/0042 16/35 R |
| 2015/0258850 A1 * | 9/2015 | Schioppa | ............... | B60B 33/021 16/35 R |

* cited by examiner

CASTER BRAKE DEVICE

CROSS-REFERENCE TO RELATED APPLICATION

This non-provisional application claims priority under 35 U.S.C. § 119(a) on Patent Application No(s). 106216793 filed in Taiwan, R.O.C. on Nov. 10, 2017, the entire contents of which are hereby incorporated by reference.

FIELD OF THE INVENTION

The present invention relates to caster brake devices and, more particularly, to a caster brake device comprising a stop spindle and braking gears to form a brake mechanism.

BACKGROUND OF THE INVENTION

Mobile carriers, such as carts, are equipped with conventional caster brake devices to prevent the mobile carriers from moving when inadvertently pushed or hit. The conventional caster brake devices each include a lock mechanism adapted to be mounted on an axle of a mobile carrier to lock the axle, thereby preventing the axle from rotating. Therefore, the conventional caster brake devices can brake the mobile carriers.

For instance, a conventional caster brake device is for use with a mobile carrier whose casters are each provided in the form of a round gear. The conventional caster brake device comprises movable gears which mesh with the round gears, respectively. Mobile carrier users move the movable gears to control the extent to which the casters mesh with the movable gears, thereby locking and unlocking the conventional caster brake device.

Considering that mobile carriers for use in hypermarkets and supermarkets are likely to collide with each other and mobile carrier users have to lock and unlock the caster brake devices frequently, the aforesaid conventional caster brake device has two drawbacks described below.

First, the gears are readily stripped, because the meshing gears must be small enough to enable the lightweight mobile carriers to move quickly and adeptly.

Second, with the meshing gears being subjected to tangential forces, the conventional caster brake device is likely to fail for reasons below. Public use of the mobile carriers does not preclude the chance that users will improperly operate the gears, for example, starting to mesh the gears while the gears are still rotating, thereby leading to bad consequences, including tilted gears, deformed gears, damaged axles, and failure to unlock.

SUMMARY OF THE INVENTION

In view of the aforesaid drawbacks of the prior art, that is unreliability and uncertainty, it is an objective of the present invention to provide a caster brake device which not only comprises a stop spindle rather a conventional gear-meshing mechanism but also changes the conventional way of locking an axle, thereby preventing failure of the caster brake device despite improper operation thereof on the part of users.

In order to achieve the above and other objectives, the present invention provides a caster brake device which comprises at least a brake gear, a receiving unit, a driving unit, at least an elastic element and an operating unit. The at least a brake gear is disposed at one of an axle and a wheel of a mobile carrier, wherein a plurality of stop slots is disposed circumferentially at a rim of the at least a brake gear. The receiving unit is coaxial with the at least a brake gear and comprises at least a penetrating recess corresponding in position to one of the stop slots. The driving unit is received in the receiving unit. The driving unit comprises a penetrating portion and a stop spindle. The penetrating portion corresponds in position to the at least a penetrating recess. The stop spindle penetrates the at least a penetrating recess and the penetrating portion, has an end portion corresponding in position to one of the stop slots, and is movably confined to the at least a penetrating recess, so as to enter or exit the stop slots. The elastic element has two ends abutting against the receiving unit and the driving unit, respectively. The operating unit connects with the driving unit to effect operation thereof. The operating unit effects the operation of the driving unit to compress the at least an elastic element such that the at least an elastic element restores an initial position thereof resiliently to push the driving unit, thereby allowing the stop spindle to undergo reciprocating motion within the at least a penetrating recess.

The caster brake device of the present invention features a stop spindle rather than resorts to gear meshing disclosed in the prior art so as to reduce greatly the wear and tear of an axle during a braking process. Furthermore, the stop spindle stops and brakes the gears by moving within the penetrating recess rather than relying on any tangential force exerted on the gears, and thus the caster brake device of the present invention operates precisely and steadily.

In an embodiment, the stop spindle has a non-skid portion which meshes with or is inserted into the penetrating portion.

In an embodiment, the driving unit has a front positioning portion corresponding in shape to an inner wall of the receiving unit such that the driving unit is prevented from rotating relative to the receiving unit.

In an embodiment, the driving unit has a rear positioning portion abutting against an inner wall of the receiving unit such that the driving unit is restricted to vertical motion relative to the receiving unit.

In an embodiment, the receiving unit and the driving unit each have a limiting recess, the two limiting recesses being opposite each other, and the at least an elastic element fits between the two limiting recesses.

In an embodiment, the at least a brake gear has a plurality of teeth disposed between the stop slots, and the top of each tooth tilts toward two adjacent stop slots.

In an embodiment, the at least a brake gear and the at least a penetrating recess are each paired, the paired brake gears symmetrically flanking the mobile carrier, and the paired penetrating recesses symmetrically flanking the mobile carrier.

As shown in the above embodiments, a caster brake device of the present invention features a non-skid portion, a front positioning portion and a rear positioning portion which together ensure that a driving unit in operation is restricted to unidirectional, linear motion and never deviates for any reason attributable to an operating unit, nor does the driving unit tilts or rotates because of any change in the direction of rotation of an axle of a mobile carrier. Therefore, the caster brake device of the present invention manifests enhanced stability.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE EMBODIMENT OF THE INVENTION

Figure 1:
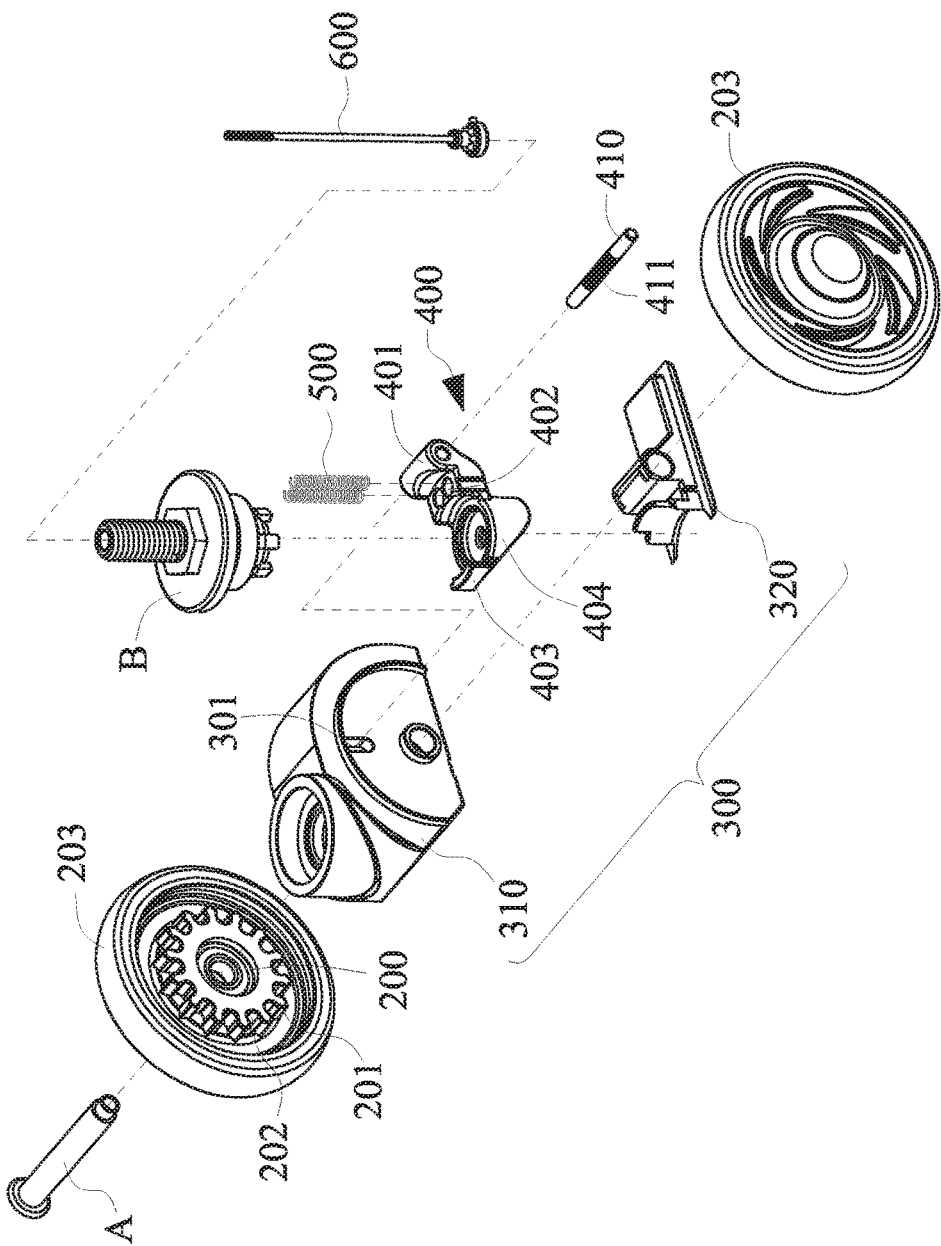
FIG. 1 is an exploded view of a caster brake device according to an embodiment of the present invention.

Referring to FIG. 1, a caster brake device 100 comprises two brake gear 200, a receiving unit 300, a driving unit 400, two elastic elements 500 and an operating unit 600. The two brake gears 200 are pivotally disposed at two ends of an axle A or two wheels 203 of a mobile carrier, respectively, and rotate coaxially with the axle A or the wheels 203. A plurality of stop slots 202 is disposed circumferentially at the rim of each brake gear 200.

The receiving unit 300 is pivotally disposed at a rotating shaft B of the mobile carrier. The receiving unit 300 is coaxial with the brake gears 200 and comprises an upper cover 310 and a base 320. The upper cover 310 and the base 320 each have a pivotal hole penetrable by the axle A to allow the upper cover 310 and the base 320 to engage with each other and form a receiving space there between. As shown in FIG. 1, the upper cover 310 of the receiving unit 300 is flanked by two penetrating recesses 301 formed penetratingly thereon and corresponding in position to one of the stop slots 202. The penetrating recesses 301 are each oblong with two ends corresponding in position to the outermost tip of a corresponding one of teeth 201 of the brake gears 200 and the outermost radial tip of the stop slot 202, respectively.

Figure 2A:
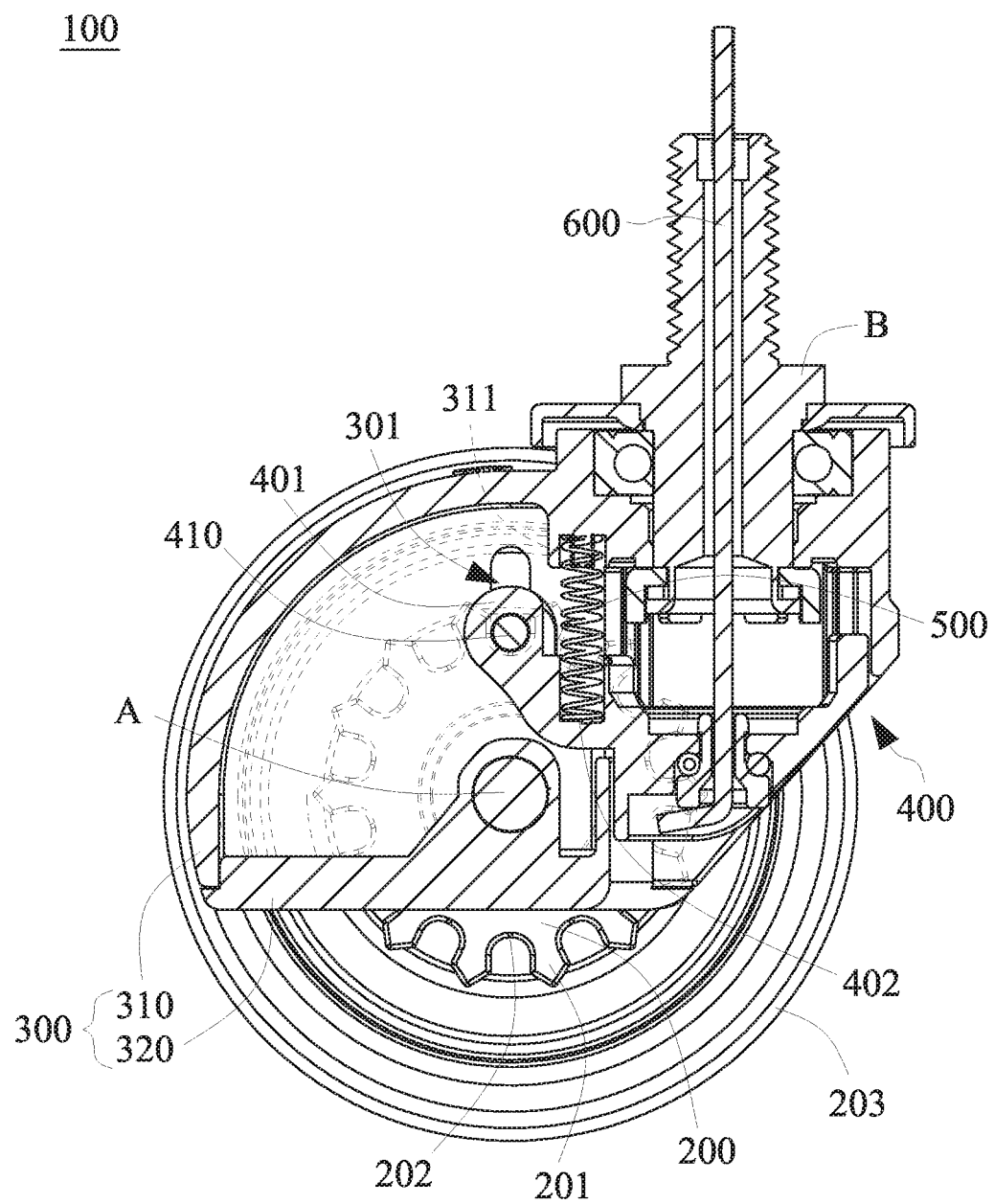
FIG. 2A is a schematic view of pressing down an operating unit of the caster brake device.
Figure 2B:
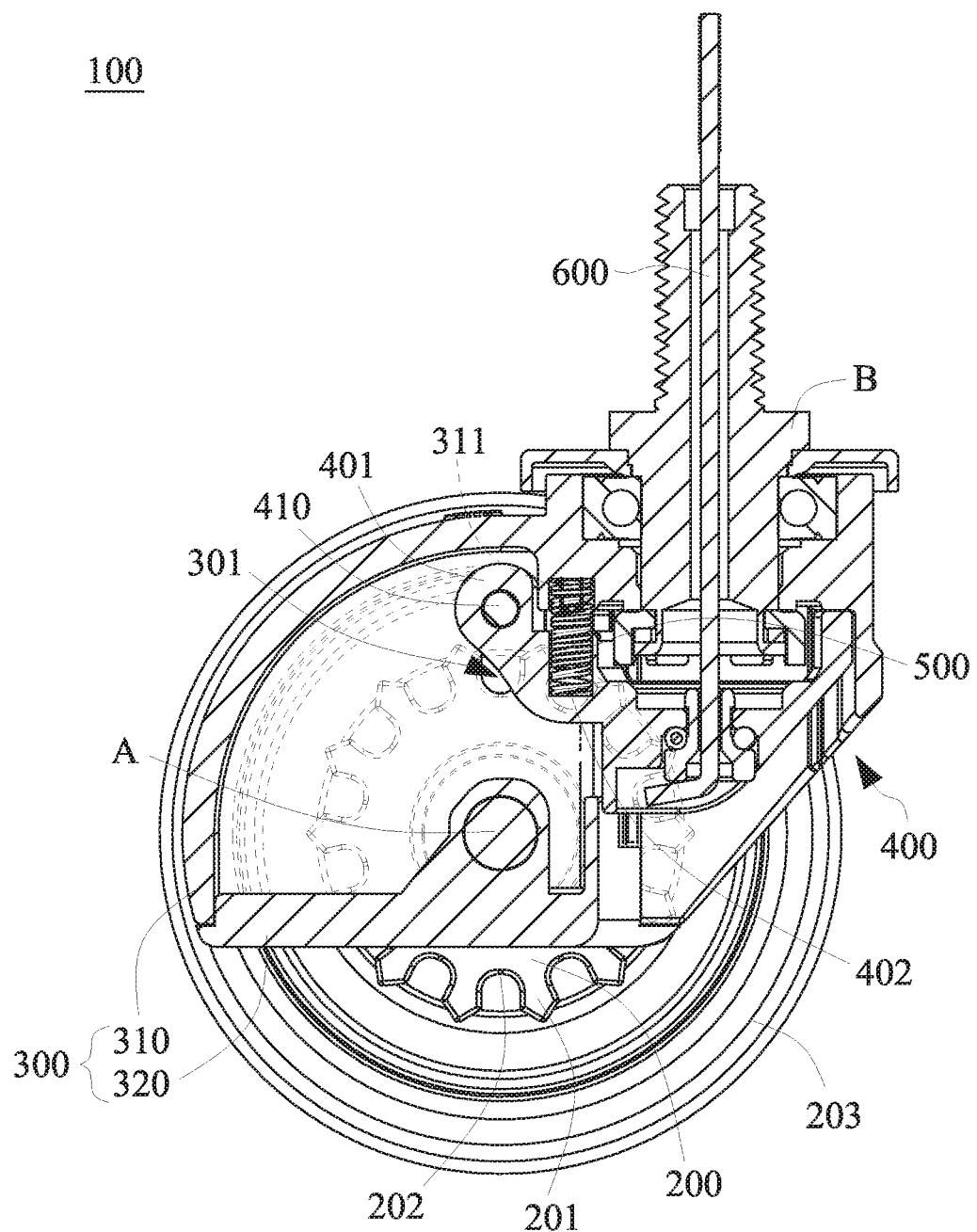
FIG. 2B is a schematic view of pulling the operating unit of the caster brake device upward.

Referring to FIG. 2A and FIG. 2B, there are shown two schematic views of how to press down an operating unit of the caster brake device 100 and thus lock the caster brake device 100 and how to pull the operating unit of the caster brake device 100 upward and thus unlock the caster brake device 100, respectively. The driving unit 400 is received in the receiving unit 300 and comprises a penetrating portion 401 and a stop spindle 410. The penetrating portion 401 corresponds in position to the penetrating recesses 301. The stop spindle 410 penetrates the penetrating portion 401 and the penetrating recesses 301. As mentioned before, the penetrating recesses 301 each have two ends corresponding in position to the outermost tip of a corresponding one of the teeth 201 of the brake gears 200 and the outermost radial tip of the stop slot 202, respectively. Hence, the stop spindle 410 has an end portion exposed from the penetrating recesses 301 but confined to between the outermost tips of the teeth 201 and the stop slots 202. The operating unit 600 is a metallic cable penetratingly disposed at the rotating shaft B of the mobile carrier and then connected to the driving unit 400 to drive the driving unit 400 up and down within the receiving unit 300.

Referring to FIG. 2A, which illustrates a default state, with the receiving unit 300 being connected to the axle A of the mobile carrier, a limiting recess 311 is regarded as a fixing end of the elastic elements 500 under the weight of the mobile carrier to allow the elastic elements 500 to press the driving unit 400 and the operating unit 600 downward under a restoring force and allow the driving unit 400 to drive the stop spindle 410 into the stop slots 202. As shown in FIG. 2B, to move the mobile carrier, a user pulls the operating unit 600 upward to allow the driving unit 400 to go against the restoring force of the elastic elements 500 and allow the stop spindle 410 to exit the stop slots 202 and get exposed from the teeth 201, thereby allowing the brake gears 200 and the wheels 203 to rotate about the axle A synchronously.

Therefore, the stop spindle 410 and the stop slots 202 together form a lateral stop mechanism, as opposed to the conventional gear-meshing mechanism disclosed in the prior art; hence, the present invention is advantageous in that it prevents lock failure by precluding excessive wear and tear of the gears being locked. Another advantage of the present invention is that the stop spindle 410 moves relative to the stop slots 202 and thereby performs locking and unlocking functions without resorting to gear meshing, and thus the shapes and sizes of the teeth of the brake gears 200 can be designed to enable the teeth to resist abrasion and thus be durable, thereby extending the service life of the caster brake device 100. Yet another advantage of the present invention is that, given a lateral stop mechanism, the gears of the caster brake device 100 are unlikely to tilt and get damaged under a tangential force as a result of improper operation gear, and thus the caster brake device 100 operates reliably and precisely.

As shown in FIG. 1, the top of each tooth 201 tilts toward two adjacent stop slots 202 to form an oblique surface serving as a guide such that the stop spindle 410 can slide smoothly into the stop slots 202.

The stop spindle 410 has a non-skid portion 411 with which the penetrating portion 401 is in contact. The non-skid portion 411 and the penetrating portion 401 are coupled together by gear meshing or insertion to prevent the stop spindle 410 and the driving unit 400 from rotating relative to each other or moving axially relative to each other while moving together. The upper cover 310 has therein two limiting recesses 311. Similarly, the driving unit 400 comprises two limiting recesses 402. The two elastic elements 500 are fixed in place between the limiting recesses 311 and the limiting recesses 402.

Figure 3A:
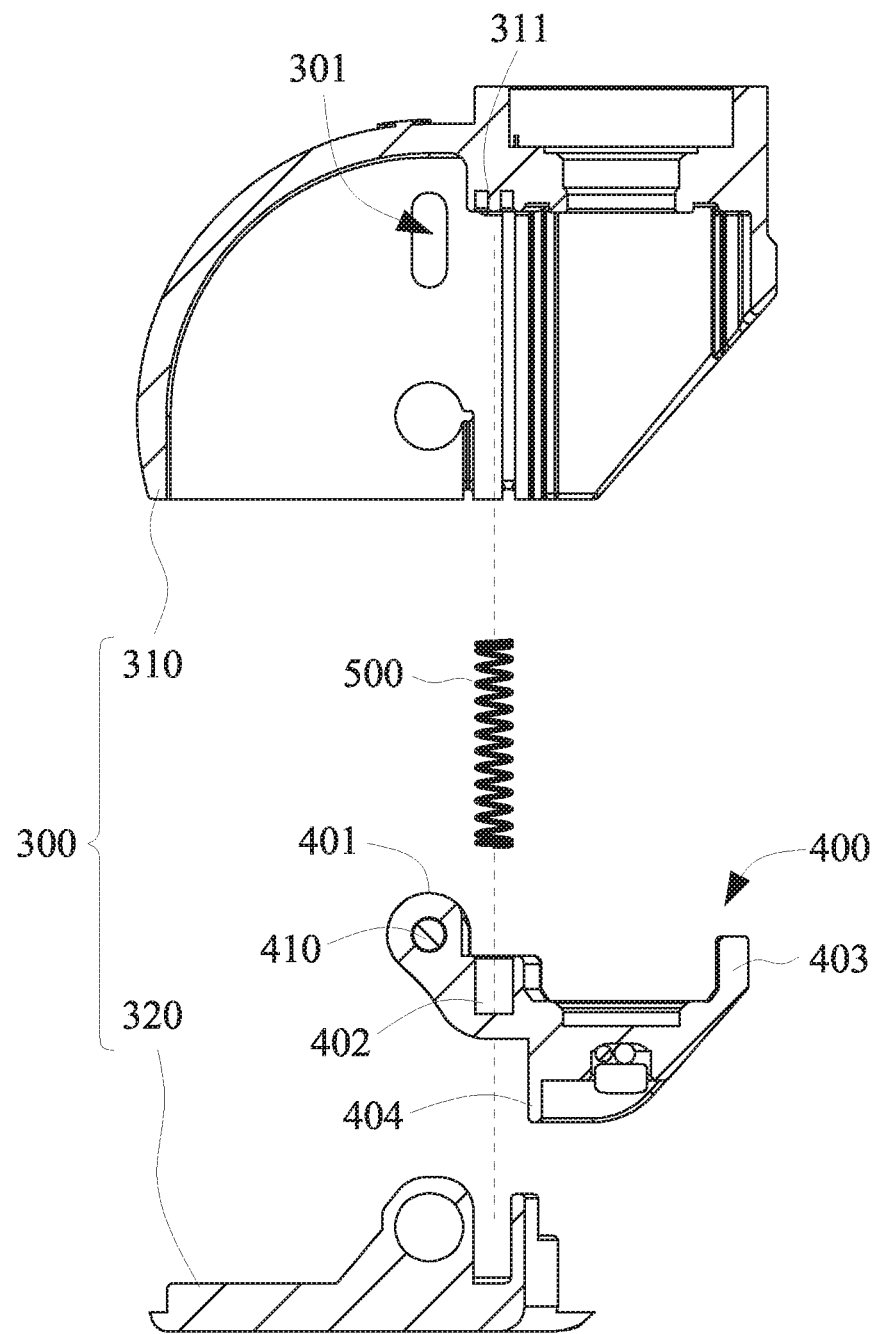
FIG. 3A is a left-side cross-sectional view of the caster brake device.
Figure 3B:
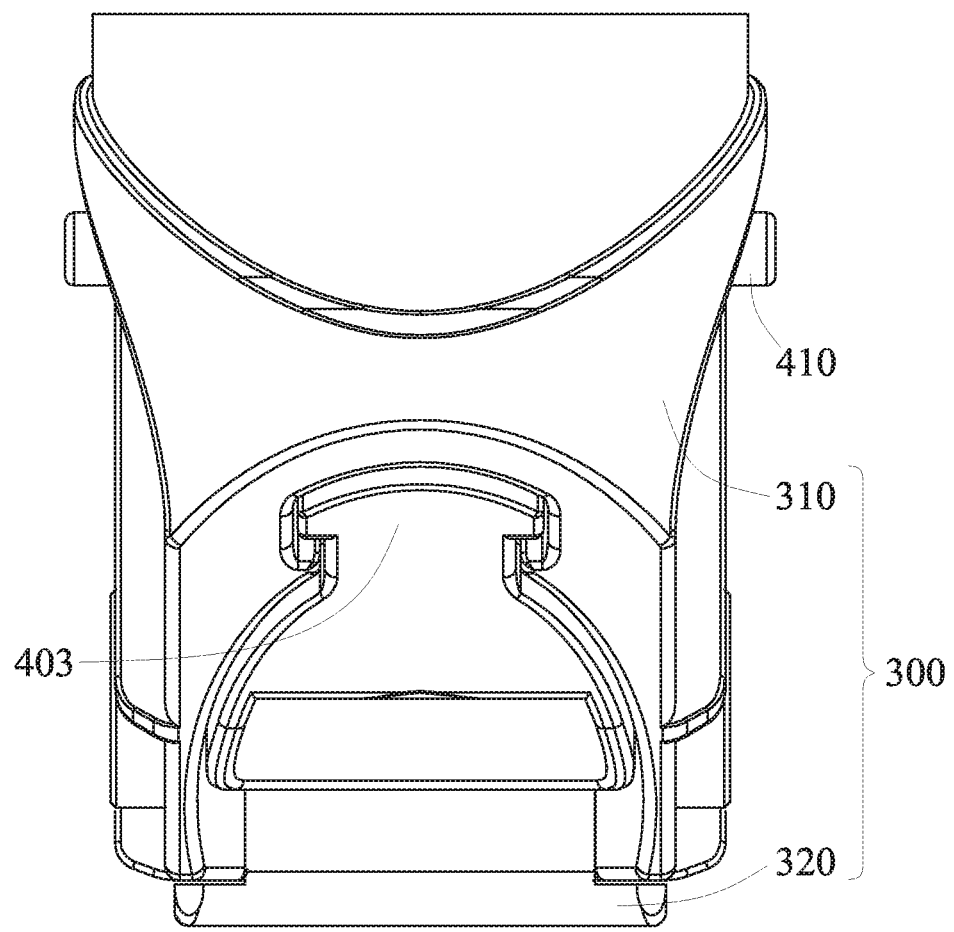
FIG. 3B is a front view of the caster brake device.

Referring to FIG. 3A and FIG. 3B, the driving unit 400 further comprises a front positioning portion 403 and a rear positioning portion 404. The front positioning portion 403 has a substantially T-shaped cross section. The rear positioning portion 404 has a round cross section. Upon the coupling together of the base 320 and the upper cover 310 of the receiving unit 300, the driving unit 400 received therein is confined thereto. The front positioning portion 403 of the driving unit 400 corresponds in shape to the inner wall of the upper cover 310, whereas the rear positioning portion 404 of the driving unit 400 corresponds in shape to the inner wall of the base 320, so as to preclude rotation or horizontal lateral movement of the driving unit 400.

In an embodiment of the present invention, the non-skid portion 411 prevents the stop spindle 410 from being subjected to any lateral force exerted by the stop slots 202 of the brake gears 200 and thus tilting laterally, whereas the front positioning portion 403 and the rear positioning portion 404 operate in conjunction with the upper cover 310 and the base 320, respectively, to allow the operating unit 600 to move steadily while operating the driving unit 400. This, coupled with the role played by the limiting recesses 311, 402 in limiting the elastic elements 500, enables the caster brake device 100 to operate in a stable manner while operating or advancing.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A caster brake device, comprising:
   at least a brake gear disposed at one of an axle and a wheel of a mobile carrier, wherein a plurality of stop slots is disposed circumferentially at a rim of the at least a brake gear, and each of the stop slots faces toward outside of the at least a brake gear;
   a receiving unit coaxial with the at least a brake gear and comprising at least a penetrating recess corresponding in position to one of the stop slots;
   a driving unit received in the receiving unit and comprising:
      a penetrating portion corresponding in position to the at least a penetrating recess; and
      a stop spindle penetrating the at least a penetrating recess and the penetrating portion, having an end portion corresponding in position to one of the stop slots, and being movably confined to the at least a penetrating recess, so as to enter or exit the stop slots;
   at least an elastic element having two ends abutting against the receiving unit and the driving unit, respectively; and
   an operating unit penetratingly disposing at a rotating shaft of the mobile carrier and connecting with the driving unit to effect operation thereof, wherein the operating unit effects the operation of the driving unit to compress the at least an elastic element such that the at least an elastic element restores an initial position thereof resiliently to push the driving unit, thereby allowing the stop spindle to undergo reciprocating motion within the at least a penetrating recess;
   wherein the operating unit is released for allowing the at least an elastic element pressing the driving unit, and the operating unit moves downward under a restoring force of the at least an elastic element for allowing the driving unit to drive the end portion of the stop spindle into the stop slot; and
   wherein the operating unit is pulled upward for allowing the driving unit to go against the restoring force of the at least an elastic element and for allowing the end portion of the stop spindle to exit the stop slot.

2. The caster brake device of claim 1, wherein the stop spindle has a non-skid portion which meshes with or is inserted into the penetrating portion.

3. The caster brake device of claim 1, wherein the driving unit has a front positioning portion corresponding in shape to an inner wall of the receiving unit such that the driving unit is prevented from rotating relative to the receiving unit.

4. The caster brake device of claim 1, wherein the driving unit has a rear positioning portion abutting against an inner wall of the receiving unit such that the driving unit is prevented from moving horizontally relative to the receiving unit.

5. The caster brake device of claim 1, wherein the receiving unit and the driving unit each have a limiting recess, the two limiting recesses being opposite each other, and the at least an elastic element fits between the two limiting recesses.

6. The caster brake device of claim 1, wherein the at least a brake gear has a plurality of teeth disposed between the stop slots, and a top of each said tooth tilts toward two adjacent said stop slots.

7. The caster brake device of claim 1, wherein the at least a brake gear and the at least a penetrating recess are each in a number of two, the two brake gears symmetrically flanking the mobile carrier, and the two penetrating recesses symmetrically flanking the mobile carrier.

\* \* \* \* \*